US012636703B2

(12) United States Patent
Burton et al.

(10) Patent No.: US 12,636,703 B2
(45) Date of Patent: May 26, 2026

(54) CAVITY PLUG ADDITIVE PART REMOVAL FROM BUILD PLATE

(71) Applicant: GE Infrastructure Technology LLC, Greenville, SC (US)

(72) Inventors: Brian E. Burton, Greenville (SC); Timothy M. Moricca, Greenville, SC (US)

(73) Assignee: GE VERNOVA INFRASTRUCTURE TECHNOLOGY LLC, Greenville, SC (US)

( * ) Notice: Subject to any disclaimer, the term of this patent is extended or adjusted under 35 U.S.C. 154(b) by 420 days.

(21) Appl. No.: 18/479,173

(22) Filed: Oct. 2, 2023

(65) Prior Publication Data

US 2025/0108438 A1     Apr. 3, 2025

(51) Int. Cl.
| | |
|---|---|
| *B22F 12/00* | (2021.01) |
| *B33Y 10/00* | (2015.01) |
| *B33Y 30/00* | (2015.01) |
| *B33Y 40/00* | (2020.01) |

(52) U.S. Cl.
CPC .............. *B22F 12/00* (2021.01); *B33Y 10/00* (2014.12); *B33Y 30/00* (2014.12); *B33Y 40/00* (2014.12)

(58) Field of Classification Search
CPC ......... B65D 55/04; B22F 12/00; B33Y 10/00; B33Y 30/00; B33Y 40/00
See application file for complete search history.

(56) References Cited

U.S. PATENT DOCUMENTS

| | | | | |
|---|---|---|---|---|
| 581,157 | A | * | 4/1897 | Hannaford ........... B65D 39/025 |
| | | | | 215/901 |
| 5,454,479 | A | * | 10/1995 | Kraus .................... B62D 25/24 |
| | | | | 215/DIG. 1 |
| 6,872,039 | B2 | * | 3/2005 | Baus ..................... F16B 19/109 |
| | | | | 411/347 |
| 9,024,188 | B2 | * | 5/2015 | Lacey, Jr. ........... H02G 3/0608 |
| | | | | 174/68.3 |
| 2017/0028491 | A1 | | 2/2017 | Trimmer et al. |
| 2017/0173669 | A1 | | 6/2017 | Moricca et al. |
| 2019/0337056 | A1 | | 11/2019 | El Naga et al. |
| 2021/0299751 | A1 | | 9/2021 | Mega et al. |
| 2022/0118514 | A1 | | 4/2022 | Hafner et al. |

FOREIGN PATENT DOCUMENTS

| | | | | |
|---|---|---|---|---|
| CN | 109465448 | A | * | 3/2019 ............. B33Y 30/00 |
| WO | 2020120891 | A1 | | 6/2020 |

OTHER PUBLICATIONS

CN 109465448 A machine translation (Year: 2019).*
European Search Report, EP24199180.1, Mar. 5, 2025 (11 pages).

* cited by examiner

*Primary Examiner* — Tima M. McGuthry-Banks
(74) *Attorney, Agent, or Firm* — Eversheds Sutherland (US) LLP

(57) ABSTRACT

The present application provides a cavity plug for a cavity extending through a first wall of a component manufactured in an additive manufacturing system. The cavity plug may include an outer shell, a first seal sized to seal about the cavity extending through the first wall of the component, and a locking mechanism positioned within the outer shell. The locking mechanism includes a locking arm to engage the first wall and seal the cavity plug in place.

11 Claims, 5 Drawing Sheets

CAVITY PLUG ADDITIVE PART REMOVAL FROM BUILD PLATE

TECHNICAL FIELD

The present application and the resultant patent relate generally to additive manufacturing systems and more particularly relate to a sealing device such as a cavity plug to eliminated contamination of internal cavities in an additive component when the additive component is removed from a build plate.

BACKGROUND

Complex components may be built using additive manufacturing systems. Additive manufacturing systems may build such components by continuously layering powder material in predetermined areas and performing a material transformation process, such as sintering or melting, on the powder material. The material transformation process may alter the physical state of the powder material from a granular composition to a solid material to build the component. The components built using the additive manufacturing systems may have nearly identical physical attributes as conventional components typically made by performing machining processes on stock material and the like.

Conventional additive manufacturing systems generally build components on large, solid build plates. Many components manufactured on conventional build plates may include cavities or voids formed therein. When the component is removed from the build plate by, for example, saw or wire EDM, a considerable amount of swarf, i.e., metallic chips, particles, abrasive fragments, and other types of debris, may enter into the cavities. Such internal contamination may block or impede the fluid flow through the cavities and result in an adverse impact on performance. As a result, time intensive and expensive post-processing and inspection may be required to remove such contamination.

SUMMARY

The present application and the resultant patent thus provide a cavity plug for a cavity extending through a first wall of a component manufactured in an additive manufacturing system. The cavity plug may include an outer shell, a first seal sized to seal about the cavity extending through the first wall of the component, and a locking mechanism positioned within the outer shell. The locking mechanism includes a locking arm to engage the first wall and seal the cavity plug in place.

The present application and the resultant patent further provide a method of manufacturing a component with a cavity in an additive manufacturing system. The method may include the steps of creating the component on a build plate of the additive manufacturing system, inserting a cavity plug within the cavity to seal the cavity, locking the cavity plug into place via a pair of locking arms within the cavity, and removing the component from the build plate.

The present application and the resultant patent further provide an additive manufacturing system for manufacturing a component with a cavity therein. The additive manufacturing system may include a build plate for manufacturing the component thereon and a cavity plug to seal the cavity. The cavity plug may include a pair of seals and a locking mechanism with a pair of locking arm to seal the cavity plug within the cavity.

These and other features and improvements of this application and the resultant patent will become apparent to one of ordinary skill in the art upon review of the following detailed description when taken in conjunction with the several drawings and the appended claims.

DETAILED DESCRIPTION

Figure 1:
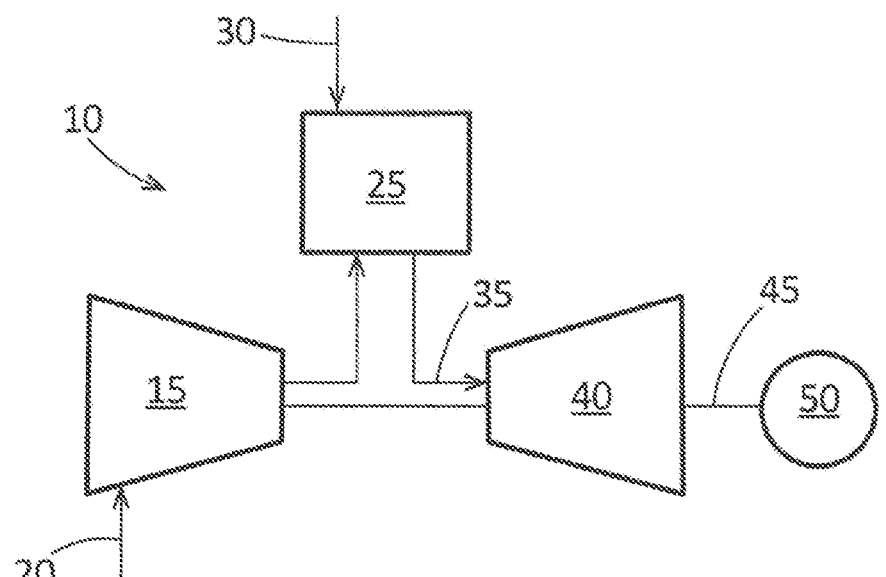
FIG. 1 is a schematic diagram of a gas turbine engine including a compressor, a combustor, a turbine, and an external load.

Referring now to the drawings, in which like numerals refer to like elements throughout the several views, FIG. 1 shows a schematic diagram of a gas turbine engine 10 as may be described herein. The gas turbine engine 10 may include a compressor 15. The compressor 15 compresses an incoming flow of air 20. The compressor 15 delivers the compressed flow of air 20 to a number of combustor cans 25. The combustor cans 25 mix the compressed flow of air 20 with a pressurized flow of fuel 30 and ignite the mixture to create a flow of hot combustion gases 35. Although only a single combustor can 25 is shown, the gas turbine engine 10 may include any number of combustor cans 25 positioned in a circumferential array and the like. Alternatively, the combustor 25 may be an annular combustor. The flow of combustion gases 35 is in turn delivered to a turbine 40. The flow of combustion gases 35 drives the turbine 40 to produce mechanical work. The mechanical work produced in the turbine 40 drives the compressor 15 via a rotor shaft 45. The turbine 40 and the rotor shaft 45 also may drive an external load 50 such as an electrical generator and the like.

The gas turbine engine 10 may use natural gas, various types of syngas, hydrogen fuel, liquid fuels, and/or other types of fuels and blends thereof. The gas turbine engine 10 may be any one of a number of different gas turbine engines offered by General Electric Company of Schenectady, New York, including, but not limited to, those such as a 7-series or a 9-series heavy duty gas turbine engine as well as LM6000 and LM9000 aeroderivative gas turbine engines and the like. The gas turbine engine 10 may be part of a simple cycle or a combined cycle power generation system or other types of generation systems. The gas turbine engine 10 may have different configurations and may use other types of components. Other types of gas turbine engines also may be used herein. Multiple gas turbine engines, other types of turbines, and other types of power generation equipment also may be used herein together.

Figure 2:
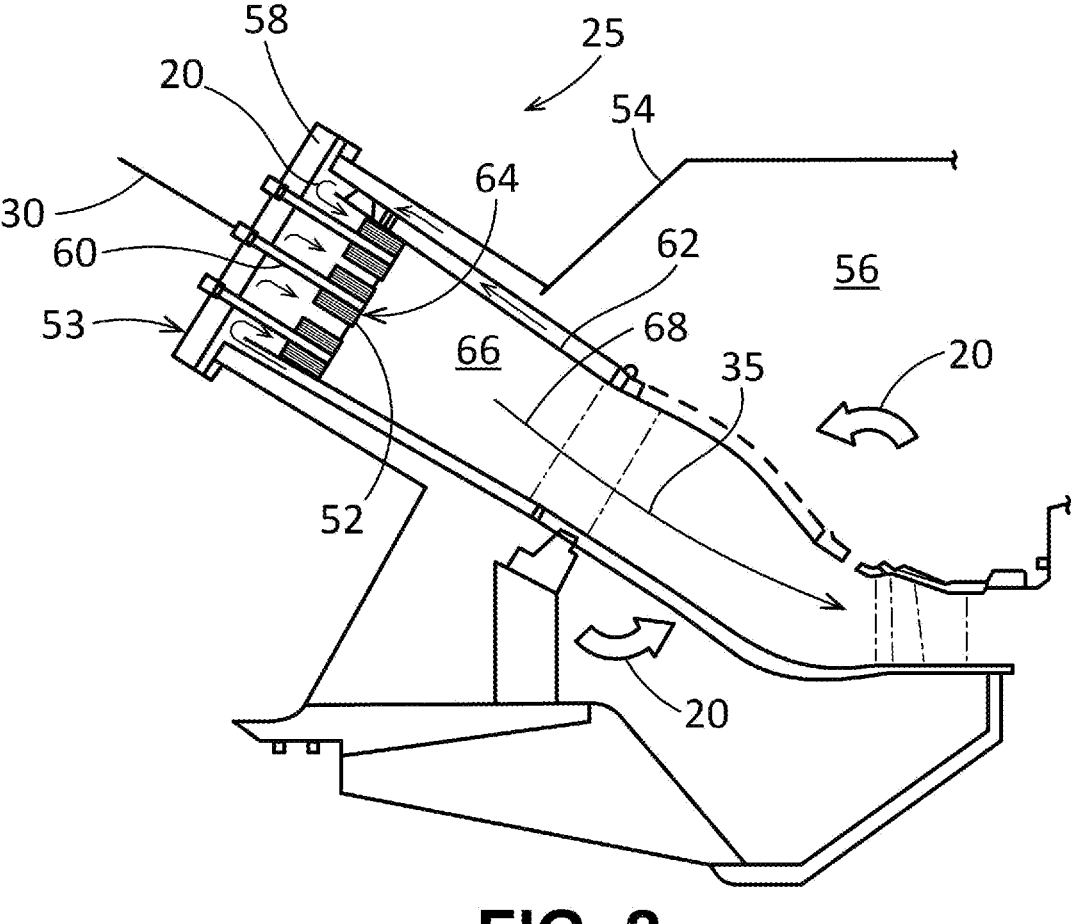
FIG. 2 is a schematic diagram of a combustor that may be used with the gas turbine engine of FIG. 1.

FIG. 2 is a partial sectional view of the combustor 25. The combustor 25 may incorporate a number of fuel injectors 52 therein. The fuel injectors 52 may be combined in a fuel nozzle assembly 53. In this example, the fuel injectors 52 may be bundled tube fuel injectors and the like. The combustor 25 is at least partially surrounded by an outer casing 54. The outer casing 54 forms a high pressure plenum 56 around the combustor 25. The high pressure plenum 56 may be in fluid communication with the compressor 15 or other source for supplying the flow of air 20 to the combustor 25. An end cover 58 is coupled to the outer casing 54. The end cover 58 may be in fluid communication with the flow of fuel 30.

The fuel injectors 52 extend downstream from the end cover 58. The fuel injector 52 may be fluidly connected to the end cover 58 so as to receive the flow of fuel 30. For example, a fluid conduit 60 may provide for fluid communication between the end cover 58 and the fuel injector 52. One end of an annular liner 62 such as a combustion liner and/or a transition duct surrounds a downstream end 64 of the fuel injector 52 so as to at least partially define a combustion chamber 66. The liner 62 defines a hot gas path 68 for directing the combustion gases 35 from the combustion chamber 66.

In operation, the flow of air 20 is routed towards the end cover 58 where it reverses direction and flows through one or more of the fuel injectors 52. The flow of fuel 30 is provided to the fuel injector 52 and the flow of fuel 30 and the flow of air 20 are premixed or combined within the fuel injector 52 before being injected into a combustion chamber 66 for combustion.

Figure 3:
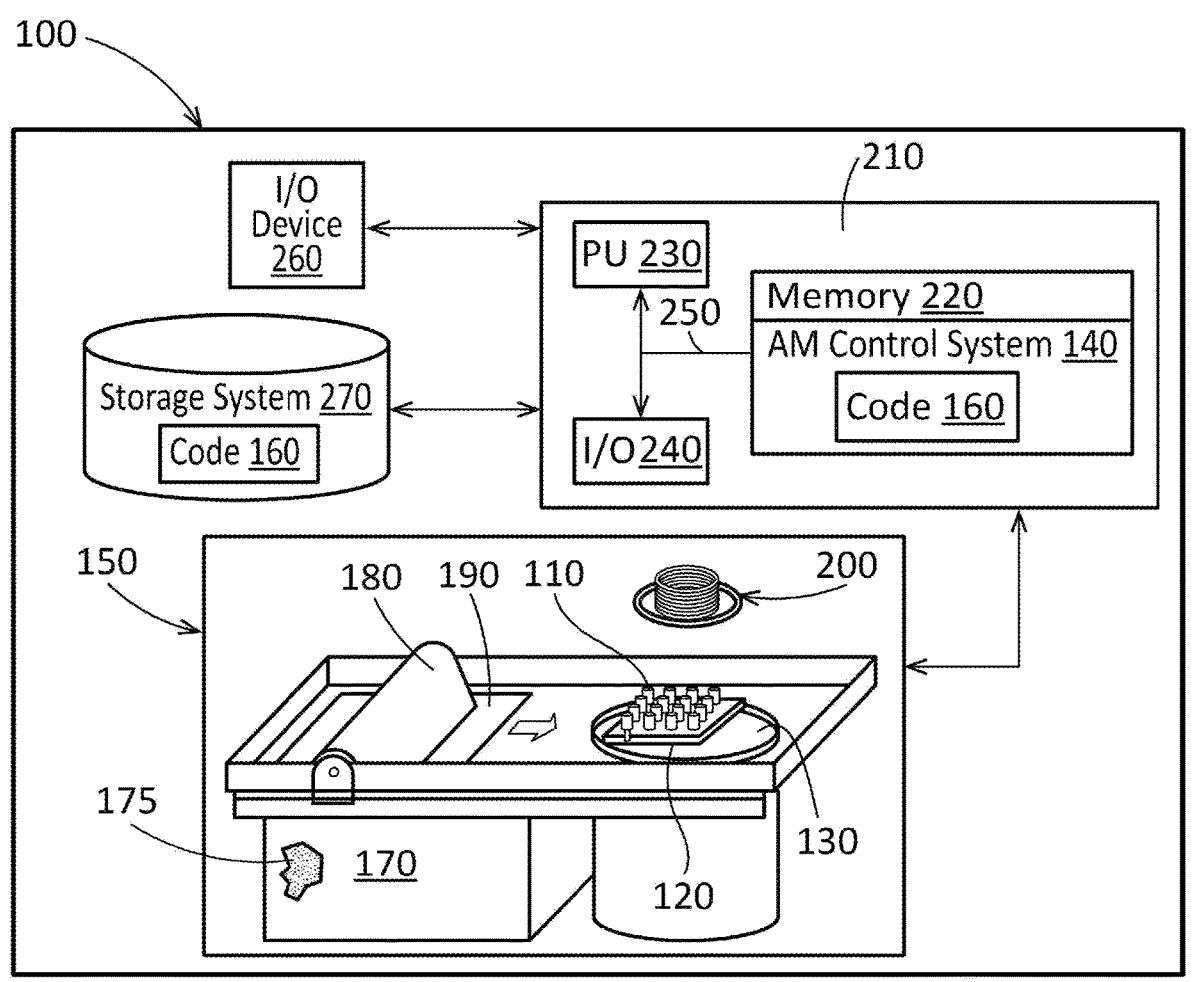
FIG. 3 is a block diagram of an additive manufacturing system including control systems.

FIG. 3 is a schematic/block view of an illustrative computerized additive manufacturing system 100 for manufacturing a component 110 on a build plate 120 positioned on a build platform 130. The additive manufacturing system 100 may be used to create components 110 such as the fuel injectors 52 and other types of hot gas path components. In this example, the additive manufacturing system 100 is arranged for direct metal laser melting (DMLM), a metal powder additive manufacturing process. It is understood that the general teachings of this disclosure are equally applicable to other forms of additive manufacturing such as binder jet, E-Beam, and the like. The additive manufacturing system 100 generally includes a computerized additive manufacturing control system 140 and an additive manufacturing printer 150. The additive manufacturing system 100 executes code 160 that includes a set of computer-executable instructions to physically generate the component 110 on the build plate 120 using the additive manufacturing printer 150. Each additive manufacturing process may use different raw materials in the form of, for example, fine-grain metal powder 175, a stock of which may be held in a chamber 170 of the additive manufacturing printer 150. For example, the component 110 may be made of a metal or a metal alloy. An applicator 180 may create a thin layer of a raw material 190 spread out as the blank canvas from which each successive slice of the final component 110 may be created. In the example shown, a laser or electron beam 200, positioned above the build plate 120, fuses particles for each slice, as defined by the code 160. Although one laser or electron beam 200 is shown, it is understood that the additive manufacturing system 100 may include any number. Various components of the additive manufacturing printer 150 may move to accommodate the addition of each new layer.

The additive manufacturing control system 140 is shown as being implemented on a computer 210 as computer program code. To this extent, the computer 210 is shown including a memory 220, a processor 230, an input/output (I/O) interface 240, and a bus 250. Further, the computer 210 is shown in communication with an external I/O device/resource 260 and an external storage system 270. In general, the processor 230 executes computer program code, such as the additive manufacturing control system 140 that may be stored in the memory 220 and/or the storage system 270 under instructions from the code 160 representative of the component 110. The computer 210 is only representative of various possible combinations of hardware and software that may be used herein.

The additive manufacturing processes begin with a non-transitory computer readable storage medium (e.g., the memory 220, the storage system 270, and the like) storing code 160 representative of the component 110. As noted, the code 160 includes a set of computer-executable instructions defining the component 110 that can be used to physically generate the component 110. For example, the code 160 may include a precisely defined 3D model of the component 110 and may be generated from any of a large variety of well-known computer aided design (CAD) software systems. The additive manufacturing system 100 executes the code 160, dividing the component 110 into a series of thin slices that it assembles using the additive manufacturing printer 150 in successive layers of powder. In the DMLM example, each layer may be melted or sintered to the exact geometry defined by the code 160 and fused to the preceding layer. Subsequently, the component 110 may be subject to any variety of finishing processes, e.g., minor machining, sealing, polishing, assembly to another part, and similar processes.

Figure 4:
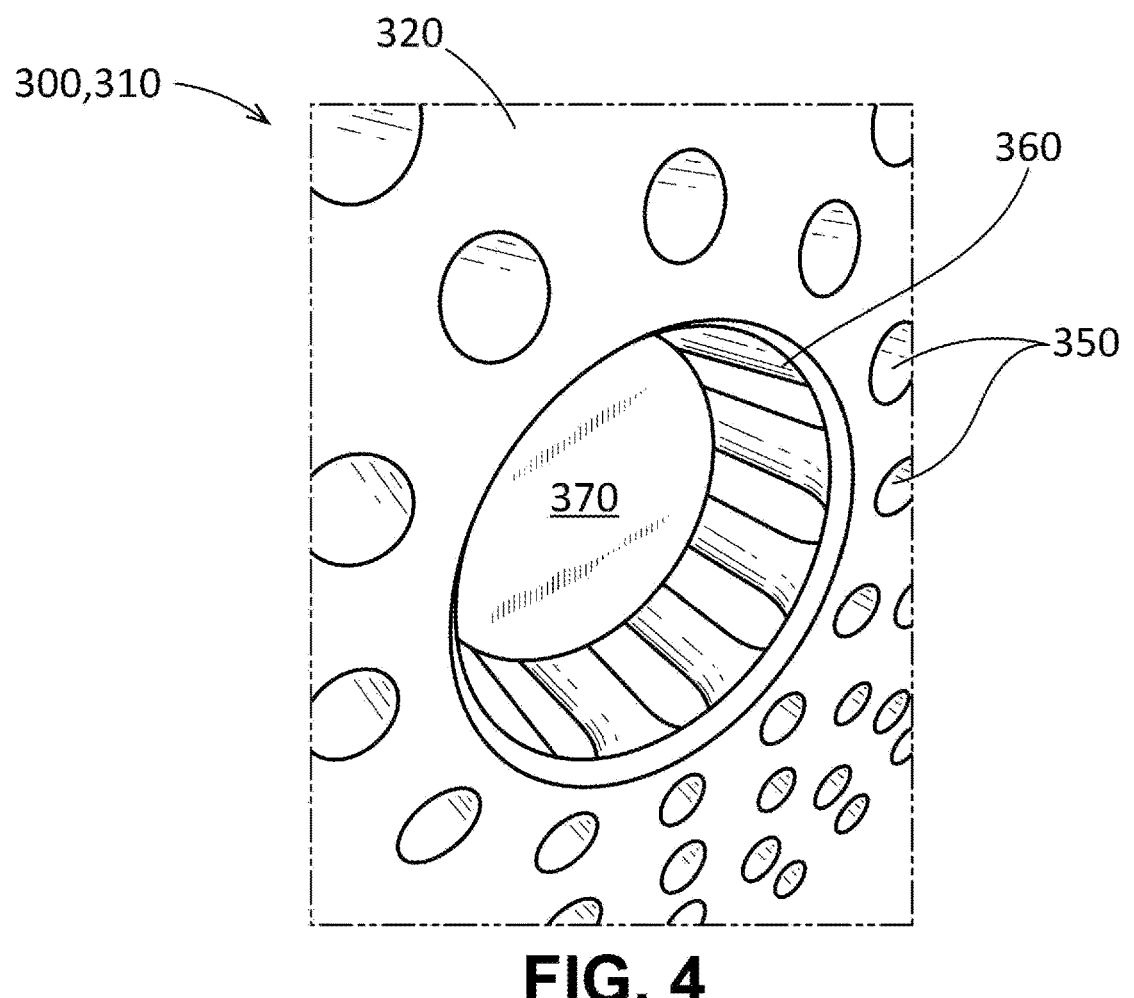
FIG. 4 is a perspective view of a central cavity of a micro-mixing injector with a cavity plug partially installed therein.
Figure 5:
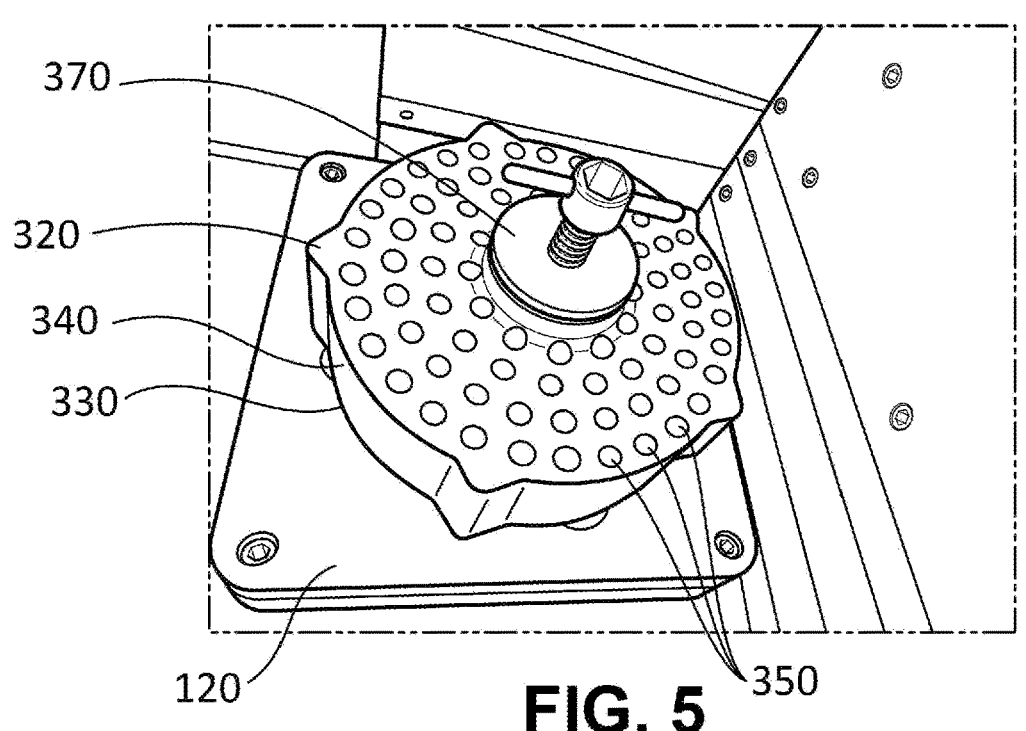
FIG. 5 is a perspective view of the micro-mixing injector with the cavity plug installed therein.
Figure 6:
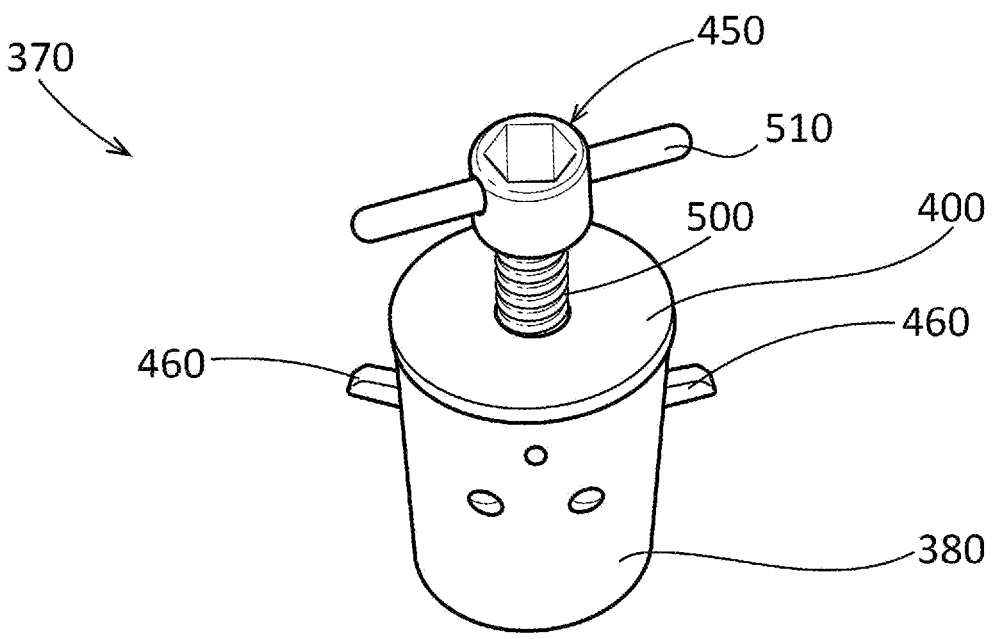
FIG. 6 is a front perspective view of the cavity plug as described herein.
Figure 7:
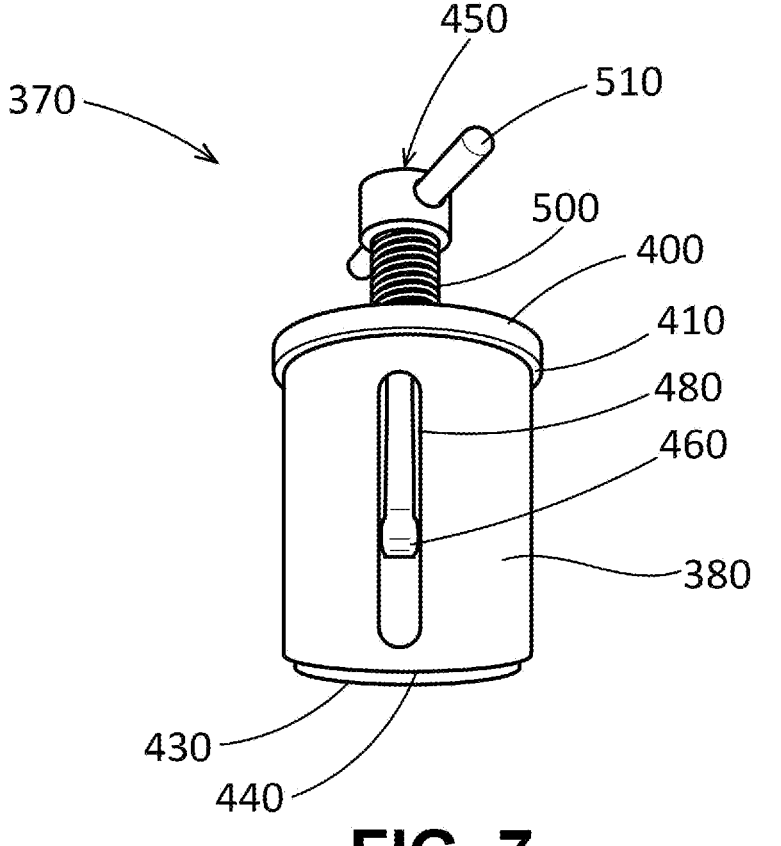
FIG. 7 is a side perspective view of the cavity plug of FIG. 6.
Figure 8:
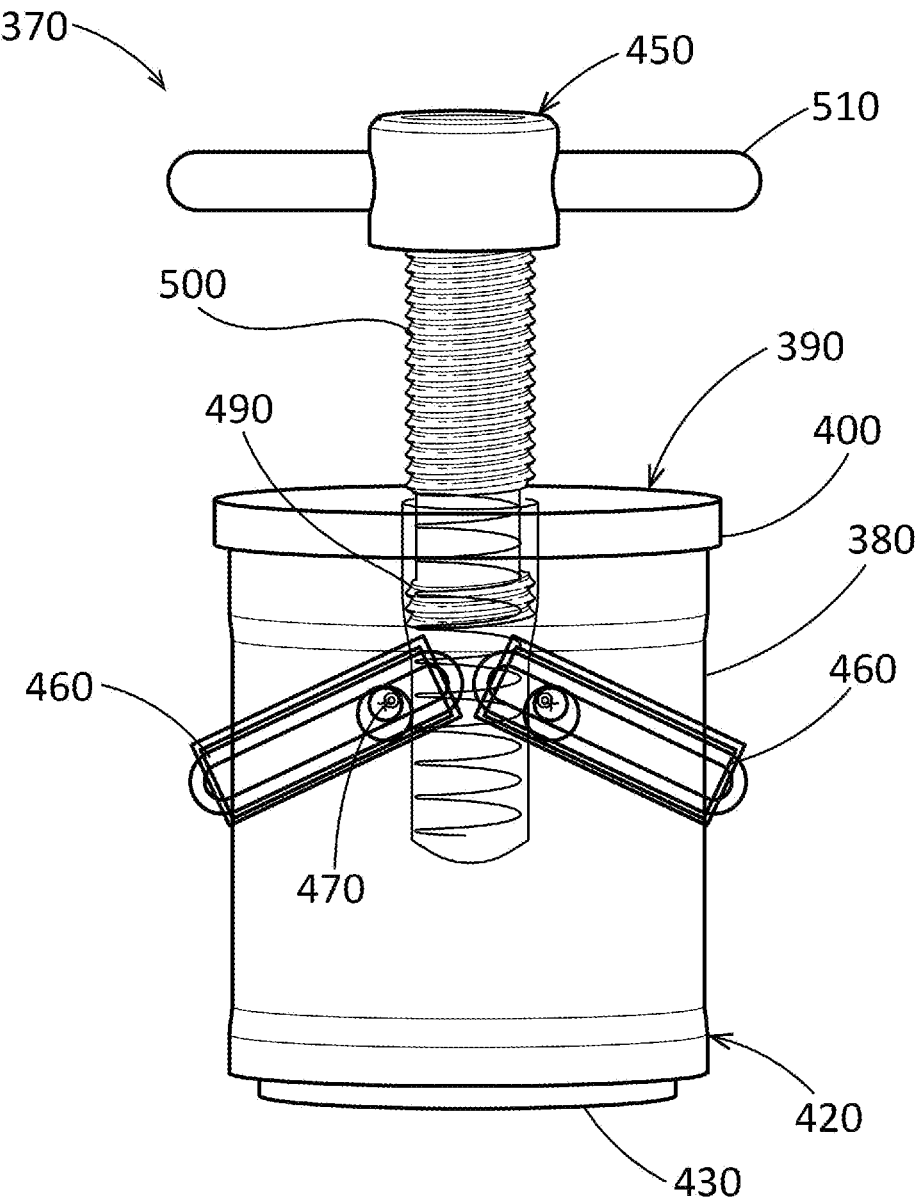
FIG. 8 is a sectional view of the cavity plug of FIG. 6.

FIGS. 4 and 5 show a component 110 manufactured by the additive manufacturing system 100. In this example, the component may be a fuel injector 300 similar to the fuel injector 52 described above. Specifically, the fuel injector 300 may be a pre-mixing or a micro-mixing injector 310. Generally described, the micro-mixing injector 310 may have a first plate or wall 320, a second plate or wall 330, and a sidewall 340 in-between. A number of pre-mixing or micro-mixing tubes 350 may extend from the first wall 320 to the second wall 330. A central cavity 360 extends between the first wall 320 and the second wall 330. The micro-mixing tubes 350 surround the central cavity 360. As described above, when the component 110 is removed from the build plate 120 (shown in FIG. 5), swarf and other debris may enter the central cavity 360. This debris may be difficult to remove and may create operational issues. (By contrast, the micro-mixing tubes 350 are easy to clean in that they extend directly from the first wall 320 to the second wall 330.)

FIGS. 5-8 show a cavity plug 370 as may be described herein. The cavity plug 370 may be sized to fill and seal the central cavity 360 of the micro-mixing injector 310. The cavity plug 370 may include an outer shell 380. The outer shell 380 is shown as cylindrical but may take any convenient shape. The outer shell 380 may be made out of any substantially rigid material such as stainless steel and the like. The outer shell 380 may be enclosed on a top end or a first end 390 by a top lid 400 and a top lid seal 410. The top lid 400 and the top lid seal 410 may have a diameter that is larger than the diameter of the outer shell 380 but seals within or on top of the diameter of the central cavity 360 through the first wall 320 of the micro-mixing injector 310. The outer shell 380 may be enclosed on a second end or a bottom end 420 by a bottom flange 430 and a bottom flange seal 440. The bottom flange 430 and the bottom flange seal 440 may have a diameter that is smaller than the diameter of the outer shell 380 but seals within the diameter of the central cavity 360 through the second wall 330 of the micro-mixing injector 310. The seals 410, 440 may be made out of any substantial pliable and/or geometry conforming material. Other components and other configurations may be used herein.

The cavity plug 370 may include a locking mechanism 450. The locking mechanism 450 may include a pair of pivoting locking arm 460. The locking arms 460 may be recessed or contoured to accommodate the shape of the walls 320, 330 or other elements of the component 110. Each of the locking arms 460 may pivot about a pivot rod 470. The pivot rods 470 may be attached to the outer shell 380. Each of the locking arms 460 may pivot along a pivot slot 480 in the outer shell 380. The locking arms 460 may be maneuvered by a pivot spring 490. The pivot spring 490 may be compressed and released by a locking bolt 500. The locking bolt 500 may have a handle 510 for ease of turning. Other types of linear motion devices such as pneumatic or hydraulic cylinder, servos, and the like also may be used. Other components and other configurations may be used herein.

In use, the micro-mixing injector 310 or other type of component 110 is manufactured in the additive manufacturing system 100 as described above. Before the micro-mixing injector 310 is removed from the build plate 120. The cavity plug 370 may be positioned within the central cavity 360. Turning the locking bolt 500 causes the locking arms 460 to engage under the first wall 320 of the micro-mixing injector 310. The motion causes the top lid 400 and the top lid seal 410 to engage on top of and within the central cavity 360 through the first wall 320 and the bottom flange 430 and the bottom flange seal 440 to engage on top of and within the central cavity 360 through the second wall 330. This pulling action compresses the seals 410, 440 and creates the tight seal. The micro-mixing injector 310 may now be removed from the build plate 120 without fear of contaminating the central cavity 360. The cavity plug 370 thus may be removed. The micro-mixing injector 310 then may be further processed as appropriate. Other components and other configurations may be used herein.

It should be apparent that the foregoing relates only to certain embodiments of this application and resultant patent. Numerous changes and modifications may be made herein by one of ordinary skill in the art without departing from the general spirit and scope of the invention as defined by the following claims and the equivalents thereof.

Further aspects of the invention are provided by the subject matter of the following clauses:

1. A cavity plug for a cavity extending through a first wall of a component manufactured in an additive manufacturing system, the cavity plug comprising: an outer shell; a first seal sized to seal about the cavity extending through the first wall of the component; and a locking mechanism positioned within the outer shell; the locking mechanism comprising a locking arm to engage the first wall and seal the cavity plug in place.

2. The cavity plug of any preceding clause, wherein the outer shell comprises a top lid with the first seal thereabout.

3. The cavity plug of any preceding clause, wherein the outer shell comprises a first diameter, wherein the top lid comprises a second diameter, and wherein the second diameter is greater than the first diameter.

4. The cavity plug of any preceding clause, wherein the component comprises a second wall with the cavity extending therethrough and wherein the outer shell comprises a second seal sized to seal about the cavity extending through the second wall of the component.

5. The cavity plug of any preceding clause, wherein the outer shell comprises a bottom flange with the second seal thereabout.

6. The cavity plug of any preceding clause, wherein the outer shell comprises a first diameter, wherein the bottom flange comprises a second diameter, and wherein the second diameter is smaller than the first diameter.

7. The cavity plug of any preceding clause, wherein the locking arm comprises a pair of locking arms.

8. The cavity plug of any preceding clause, wherein the outer shell comprises a pair of pivot slots and wherein the pair of locking arms pivot within the pivot slots.

9. The cavity plug of any preceding clause, wherein each of the pair of locking arms pivot about a pivot rod.

10. The cavity plug of any preceding clause, wherein the locking mechanism comprises a pivot spring in communication with the pair of locking arms.

11. The cavity plug of any preceding clause, wherein the locking mechanism comprises a locking bolt in communication with the pivot spring.

12. The cavity plug of any preceding clause, wherein the locking bolt comprises a handle.

13. The cavity plug of any preceding clause, wherein the component comprises a fuel injector.

14. The cavity plug of any preceding clause, wherein the component comprises a micro-mixing injector.

15. A method of manufacturing a component with a cavity therein in an additive manufacturing system, comprising: creating the component on a build plate of the additive manufacturing system; inserting a cavity plug within the cavity to seal the cavity; locking the cavity plug into place via a pair of locking arms within the cavity; and removing the component from the build plate.

16. An additive manufacturing system for manufacturing a component with a cavity therein, comprising: a build plate for manufacturing the component thereon; and a cavity plug to seal the cavity; the cavity plug comprises a pair of seals and a locking mechanism with a pair of locking arm to seal the cavity plug within the cavity.

17. The additive manufacturing system of any preceding clause, wherein cavity plug comprises an outer shell with a top lid and a first one of the pair of seals thereabout.

18. The additive manufacturing system of any preceding clause, wherein the outer shell comprises a bottom flange and a second one of the pair of seals thereabout.

19. The additive manufacturing system of any preceding clause, wherein the outer shell comprises a pair of pivot slots and wherein the pair of locking arms pivot within the pivot slots.

20. The additive manufacturing system of any preceding clause, wherein the locking mechanism comprises locking bolt and a pivot spring in communication with the pair of locking arms.

We claim:

1. A cavity plug for a cavity extending through a first wall of a component manufactured in an additive manufacturing system, the cavity plug comprising:

an outer shell;

a first seal sized to seal about the cavity extending through the first wall of the component; and a locking mechanism positioned within the outer shell;

the locking mechanism comprising a pair of locking arms to engage the first wall and seal the cavity plug in place;

wherein the outer shell comprises a pair of pivot slots and
wherein the pair of locking arms pivots within the pair
of pivot slots; and wherein each of the pair of locking arms pivot about a
pivot rod.

2. The cavity plug of claim 1, wherein the outer shell comprises a top lid with the first seal thereabout.

3. The cavity plug of claim 2, wherein the outer shell comprises a first diameter, wherein the top lid comprises a second diameter, and wherein the second diameter is greater than the first diameter.

4. The cavity plug of claim 1, wherein the component comprises a second wall with the cavity extending therethrough and wherein the outer shell comprises a second seal sized to seal about the cavity extending through the second wall of the component.

5. The cavity plug of claim 4, wherein the outer shell comprises a bottom flange with the second seal thereabout.

6. The cavity plug of claim 5, wherein the outer shell comprises a first diameter, wherein the bottom flange comprises a second diameter, and wherein the second diameter is smaller than the first diameter.

7. The cavity plug of claim 1, wherein the locking mechanism comprises a pivot spring in communication with the pair of locking arms.

8. The cavity plug of claim 1, wherein the component comprises a fuel injector.

9. The cavity plug of claim 1, wherein the component comprises a micro-mixing injector.

10. A cavity plug, for a cavity extending through a first wall of a component manufactured in an additive manufacturing system, the cavity plug comprising:

an outer shell;

a first seal sized to seal about the cavity extending through the first wall of the component; and a locking mechanism positioned within the outer shell;

the locking mechanism comprising a pair of locking arms to engage the first wall and seal the cavity plug in place;

wherein the locking mechanism comprises a pivot spring in communication with the pair of locking arms; and wherein the locking mechanism comprises a locking bolt in communication with the pivot spring.

11. The cavity plug of claim 10, wherein the locking bolt comprises a handle.

\* \* \* \* \*